United States Patent
Su et al.

(10) Patent No.: US 12,322,211 B2
(45) Date of Patent: Jun. 3, 2025

(54) ELECTRONIC DEVICE UNLOCKED BY SEQUENTIAL FINGERPRINTS

(71) Applicant: PIXART IMAGING INC., Hsin-Chu County (TW)

(72) Inventors: Tzung-Min Su, Hsin-Chu County (TW); Yu-Ju Lee, Hsin-Chu County (TW); Ren-Hau Gu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 146 days.

(21) Appl. No.: 18/308,678

(22) Filed: Apr. 28, 2023

(65) Prior Publication Data

US 2024/0362952 A1     Oct. 31, 2024

(51) Int. Cl.
| | |
|---|---|
| *G06V 40/12* | (2022.01) |
| *G06F 21/32* | (2013.01) |
| *G06V 10/70* | (2022.01) |
| *G06V 40/20* | (2022.01) |

(52) U.S. Cl.
CPC ............. *G06V 40/28* (2022.01); *G06F 21/32* (2013.01); *G06V 10/768* (2022.01); *G06V 40/1365* (2022.01); *G06V 40/1394* (2022.01)

(58) Field of Classification Search
CPC ............... G06V 40/28; G06V 40/1365; G06V 40/1394; G06V 10/768; G06F 21/32
See application file for complete search history.

(56) References Cited

U.S. PATENT DOCUMENTS

| | | | |
|---|---|---|---|
| 2018/0039817 A1* | 2/2018 | Romera Jolliff | G06F 21/32 |
| 2018/0068101 A1* | 3/2018 | Kasilya Sudarsan | H04W 12/065 |
| 2018/0107332 A1* | 4/2018 | Chan | G06V 40/12 |
| 2021/0064899 A1* | 3/2021 | Lee | G06V 40/1388 |

* cited by examiner

*Primary Examiner* — Benyam Haile
(74) *Attorney, Agent, or Firm* — HAUPTMAN HAM, LLP (57) ABSTRACT

There is provided an electronic device arranged to be unlocked using a fingerprint. The electronic device includes a touch pad, a processor and an operation system. The touch pad acquires fingerprint data within sequential multiple time intervals, respectively. The processor recognizes a fingerprint of each time interval according to the fingerprint data. Upon a sequence and an operating feature of multiple fingerprints matching a predetermined condition, the processor controls the operation system to unlock the electronic device.

17 Claims, 7 Drawing Sheets

| T1 | T2 | T3 | T4 | T5 | T6 |
|---|---|---|---|---|---|
| L1 | L3 | R3 | R2 | R1 | L2 |
| (L1,2S) | (L3,1S) | (R3,2S) | (R2,1S) | (R1,3S) | (L2,1S) |
| (L1,Long) | (L3,Short) | (R3,Long) | (R2,Short) | (R1,Long) | (L2,Short) |
| L1 | L3 | (R3,Long,rate) | R2 | R1 | L2 |
| (L1,H press) | (L3,L press) | (R3,H press) | (R2,L press) | (R1,H press) | (L2,L press) |

User Habit: finger area, pressure range, screen region

| | T1 | T2 | T3 | T4 |
|---|---|---|---|---|
| | (X; R1) | (L3; L2) | (L1; X) | (R2; R3) |
| | (X; R1,2S) | (L3,1S; L2,1S) | (L1,2S; X) | (R2,1S; R3,1S) |
| | (X; R1,Long) | (L3,Short; L2,Short) | (L1,Long; X) | (R2,Short; R3,Short) |
| | (X; R1) | (L3; L2) | (L1,Long,rate; X) | (R2; R3) |
| | (X; R1,High) | (L3,Low; L2,Low;) | (L1,High; X) | (R2,Low;; R3,Low;) |
| User Habit: finger area, pressure range, screen region | | | | |

ELECTRONIC DEVICE UNLOCKED BY SEQUENTIAL FINGERPRINTS

FIELD OF THE DISCLOSURE

This disclosure generally relates to fingerprint unlocking device and method and, more particularly, to an electronic device that is unlocked by recording multiple user's fingerprints in a register phase and recognizing a sequence and an operating feature of the multiple user's fingerprints in an operating phase, and unlocking methods thereof.

BACKGROUND OF THE DISCLOSURE

Nowadays almost all information can be recorded in electronic devices in a digital form. For data security purposes, the electronic devices are equipped with a digital electronic lock to prevent data leakage.

Using a user password is a traditional and convenient digital electronic lock. However, everyone will generally have several electronic devices, and it is troublesome to set one user password to each electronic device. Although it is convenient to set the same user password to all electronic devices, it will lead to a high risk. On the contrary, although the security can be significantly increased by setting different user passwords to different electronic devices, it is difficult to remember all user passwords on each electronic device.

Another choice is to use the user's physiological characteristics as an unlock tool such that the trouble of remembering all user passwords is avoided. For example, user fingerprints are different from one another and the fingerprint recognition is a mature technique, and thus the fingerprint becomes a convenient digital electronic lock. However, because the technique of making a fake-fingerprint is also rapidly processed such that a digital electronic lock which is unlocked simply using a fingerprint also has a risk of being broken.

SUMMARY

Accordingly, the present disclosure provides an electronic device that is recorded with multiple user fingerprints in a register phase and is unlocked by recognizing a sequence and an operating feature of the multiple user fingerprints in an operating phase, and unlocking methods of the electronic device.

The present disclosure provides an electronic device that is unlocked by using a sequence of multiple fingerprints so as to increase the security of a digital electronic lock, and unlocking methods thereof.

The present disclosure further provides an electronic device that is unlocked by using a sequence of multiple fingerprints in conjunction with a hold time of fingers so as to increase the security of a digital electronic lock, and unlocking methods thereof.

The present disclosure further provides an electronic device that is unlocked by using a sequence of multiple fingerprints in conjunction with a heartrate detection so as to block a fake-fingerprint by a living body detection thereby increasing the security of a digital electronic lock, and unlocking methods thereof.

The present disclosure further provides an electronic device that is unlocked by using a sequence of multiple fingerprints in conjunction with a pressure value of fingers so as to increase the security of a digital electronic lock, and unlocking methods thereof.

The present disclosure further provides an electronic device that is unlocked by using a sequence of multiple fingerprints in conjunction with user operating habits, wherein the user operating habits are used to construct a category model by the machine learning.

The present disclosure provides an electronic device including a touch pad, an operation system and a processor. The touch pad is configured to respectively output fingerprint data within sequential multiple time intervals. The operation system is embedded in the electronic device and configured to unlock the electronic device. The processor is configured to recognize a fingerprint of each time interval according to the fingerprint data, and control the operation system to unlock the electronic device upon a sequence of multiple recognized fingerprints of the multiple time intervals matching a predetermined sequence.

The present disclosure further provides an electronic device including a touch pad, an operation system and a processor. The touch pad is configured to respectively output fingerprint data within sequential multiple time intervals using a predetermined detection frequency. The operation system is embedded in the electronic device and configured to unlock the electronic device. The processor is configured to recognize a fingerprint and a hold time of the fingerprint data of each time interval according to the fingerprint data, and control the operation system to unlock the electronic device upon a sequence of multiple recognized fingerprints of the multiple time intervals matching a predetermined sequence and multiple recognized hold times matching a predetermined time variation pattern.

The present disclosure further provides an electronic device including a touch pad, an operation system and a processor. The touch pad is configured to respectively output fingerprint data within sequential multiple time intervals using a predetermined detection frequency. The operation system is embedded in the electronic device and configured to unlock the electronic device. The processor is configured to recognize a fingerprint and a pressure value of each time interval according to the fingerprint data, and control the operation system to unlock the electronic device upon a sequence of multiple recognized fingerprints of the multiple time intervals matching a predetermined sequence and multiple recognized pressure values matching a predetermined pressure variation pattern.

In the present disclosure, the operating feature includes a pressing/touching period (or called hold time herein), a pressing/operating pressure and user operating habits, wherein the user operating habits are used to construct a category model exclusive to a user during a predetermined learning period using a machine learning algorithm according to the finger areas, pressure ranges and screen regions of a user during each unlocking operation so as to prevent the electronic device being unlocked by an invalid user.

BRIEF DESCRIPTION OF DRAWINGS

Other objects, advantages, and novel features of the present disclosure will become more apparent from the following detailed description when taken in conjunction with the accompanying drawings.

DETAILED DESCRIPTION OF THE DISCLOSURE

It should be noted that, wherever possible, the same reference numbers will be used throughout the drawings to refer to the same or like parts.

One objective of the present disclosure is to provide an electronic device that is unlocked according a sequence of multiple inputted fingerprints and a user operating feature while inputting the multiple fingerprints, and unlocking methods thereof.

Figure 1:
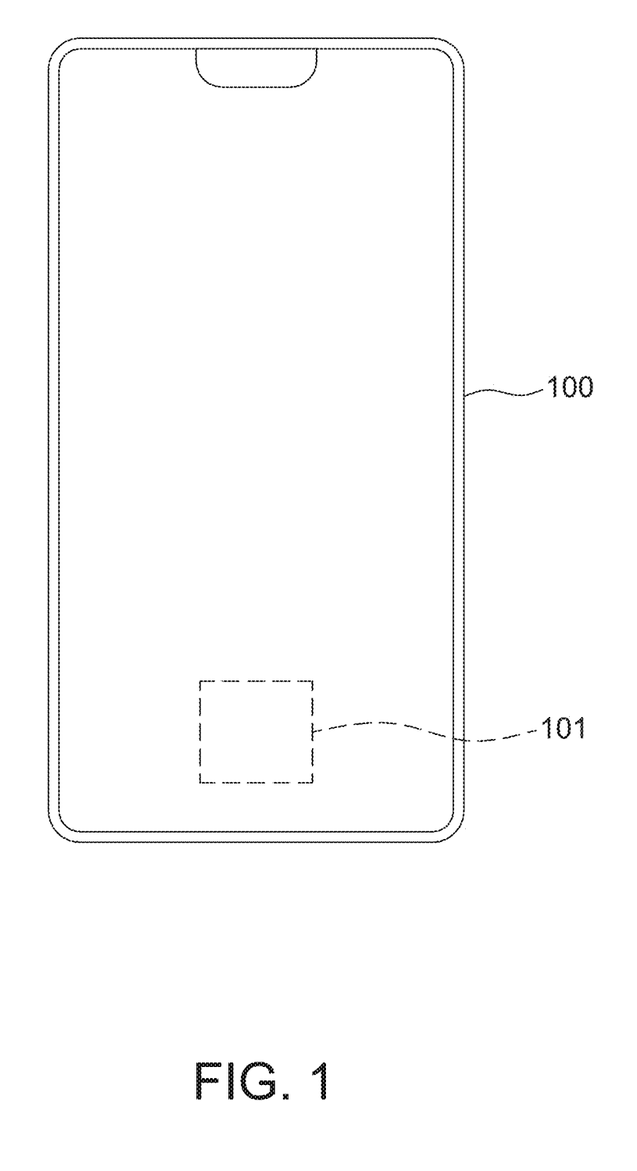
FIG. 1 is a schematic diagram of an electronic device according to one embodiment of the present disclosure, including a single fingerprint recognition region.
Figure 2:
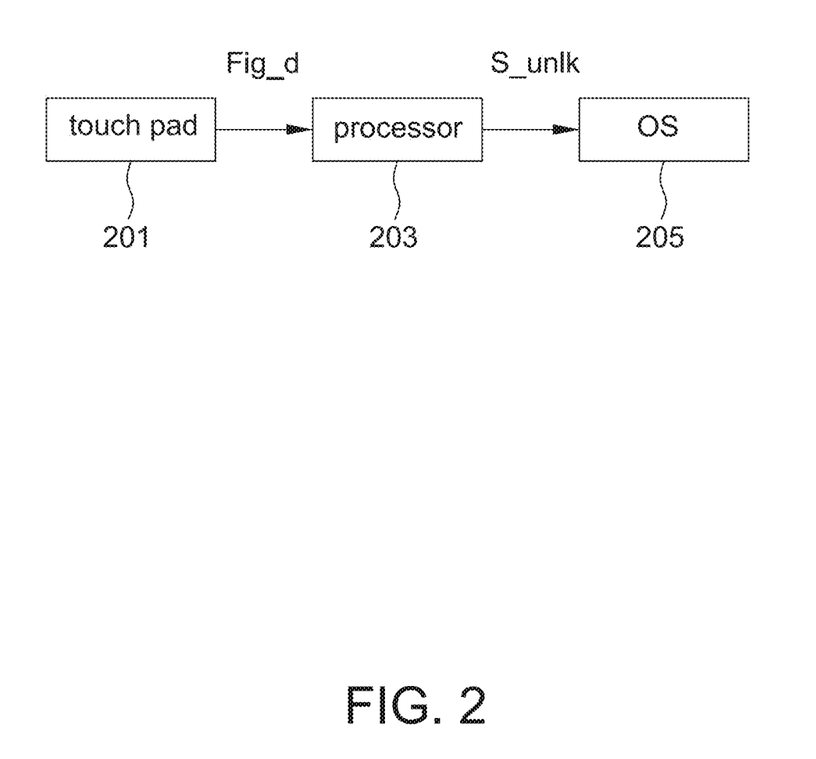
FIG. 2 is a schematic block diagram of an electronic device according to one embodiment of the present disclosure.

Please refer to FIGS. 1 and 2, FIG. 1 is a schematic diagram of an electronic device 100 according to one embodiment of the present disclosure; and FIG. 2 is a schematic block diagram of an electronic device 100 (also adapted to 400 and 700 mentioned below) according to one embodiment of the present disclosure. The electronic device 100 is illustrated by a cellphone as an example herein, but the present disclosure is not limited thereto. The electronic device 100 includes a touch pad 201, a processor 203 and an operation system (shown as OS) 205, wherein FIG. 1 shows that the touch pad 201 includes a single fingerprint recognition region 101 to allow a user to put one finger thereon during an unlocking operation.

The touch pad 201 is, for example, a capacitive touch pad, which obtains capacitance data as fingerprint data, e.g., shown as Fig_d, while a finger putting thereon. Generally, the touch pad 201 respectively outputs fingerprint data Fig_d within sequential multiple time intervals (e.g., T1 to T6 in FIG. 3 and T1 to T4 in FIG. 5) using a predetermined detection frequency, wherein each time interval preferably detects/scans multiple times and outputs multiple times of fingerprint data. The method of obtaining fingerprint data (i.e. capacitance data obtained in scanning) using a capacitive touch pad is known to the art, and thus details thereof are not described herein. The touch pad 201 of the present disclosure is not limited to the capacitive touch pad, and an optical touch pad is also adaptable to the present disclosure.

The processor 203 is, for example, a Central Processing Unit (CPU), a Micro Processing Unit (MCU), an Application Specific Integrated Circuit (ASIC), a Field Programmable Gate Array (FPGA) or the like. The processor 203 receives the fingerprint data Fig_d from the touch pad 201, and performs fingerprint recognition using a fingerprint recognition algorithm, e.g., implemented by software, firmware and/or hardware. The method of the fingerprint recognition is known to the art, and the existing fingerprint recognition algorithm is used by the processor 203 without particular limitations.

In one aspect, the processor 203 is further embedded with an algorithm for calculating a pressure value according to the fingerprint data Fig_d. For example, when a user touches the touch pad 201 using different forces, different capacitance variation is generated and thus the processor 203 is able to calculate the pressure value accordingly.

In another aspect, the touch pad 201 is further embedded with a force detecting member such that both the fingerprint data Fig_d and the pressure data are outputted to the processor 203 to be calculated thereby. The processor 203 calculates a pressure value of a finger according to force data of the force detecting member using a pressure calculation algorithm is known to the art and not particularly limited.

The operation system 205 is, for example, Android system or iOS system, which mainly controls operations of the electronic device 100 by software and/or firmware. The operations include locking the electronic device 100 in an idle state to cease a part of functions thereof, and unlocking the electronic device 100 to an operating state after the processor 203 recognizes a sequence and an operating feature of multiple inputted fingerprints, but not limited thereto. The moment that the electronic device 100 is activated to start the fingerprint recognition is determined according to different operation systems 205, e.g., including pressing a button, sensing a movement by a G-sensor without particular limitations. The functions of the electronic device 100 that are prohibited in a locked state are determined according to different operation systems 205, but at least an unlocking function is not prohibited or deactivated.

Figure 3:
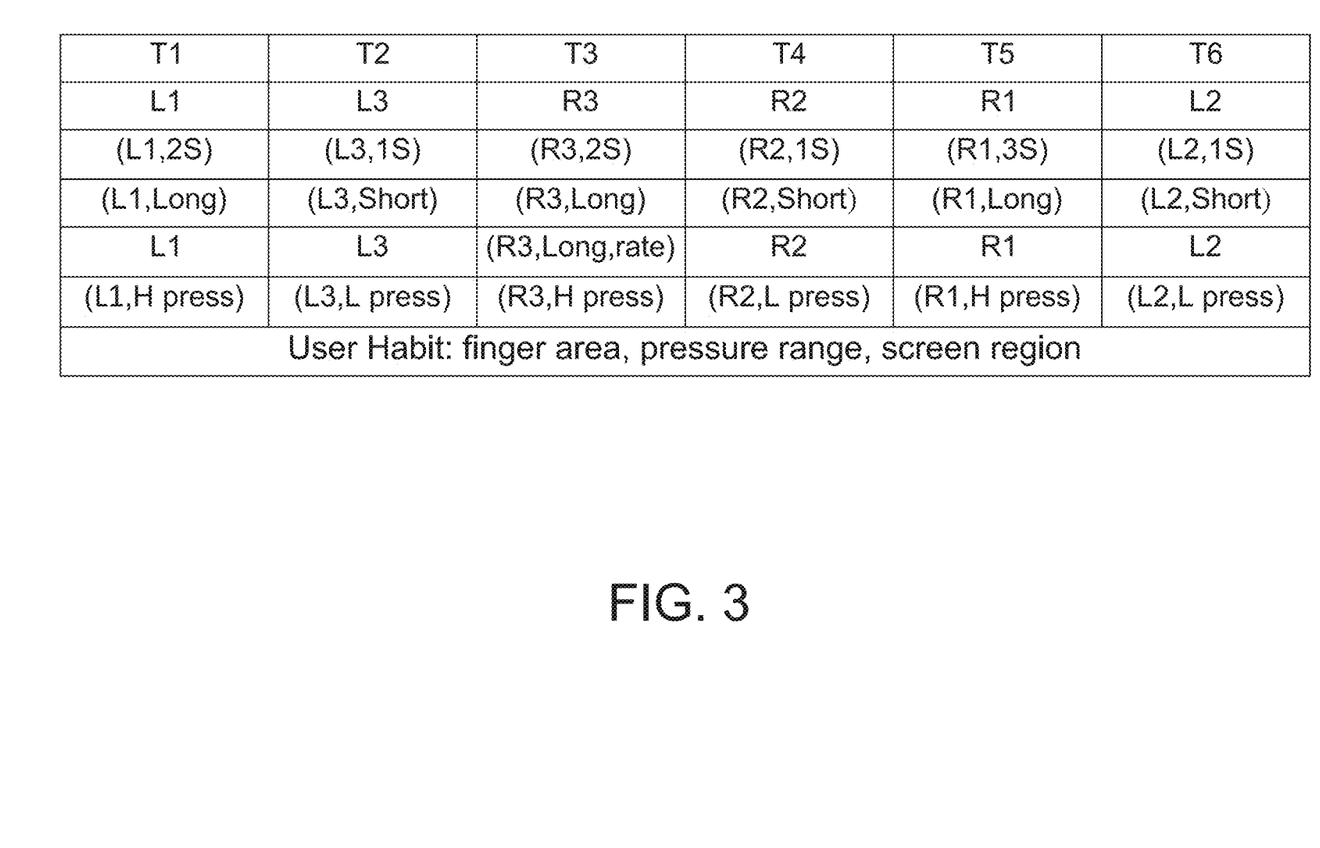
FIG. 3 is a schematic diagram of several aspects of an unlocking method of the electronic device in FIG. 1.

Please refer to FIGS. 1 to 3, FIG. 3 is a schematic diagram of an unlocking method of an electronic device 100 in an unlocking operation according to some embodiments of the present disclosure, wherein T1 to T6 indicate sequential multiple time intervals. In one aspect, the multiple time intervals T1 to T6 have the same length, e.g., 2 seconds to 5 seconds determined according to the unlocking method being used. It should be mentioned that a number of the multiple time intervals is not limited to six, and is predefined by the operation system 205 or selected by a user.

In addition, L1 to L3 shown in FIG. 3 indicate three fingers of a left hand of the user, and R1 to R3 shown in FIG. 3 indicate three fingers of a right hand of the user.

It is appreciated that before running the unlocking method of the present disclosure, the electronic device 100 is arranged to run a register phase (or called finger register phase) by the operation system 205 for a user to sequentially input (via the fingerprint recognition region) fingerprints to be used in the unlocking operation and recorded in a memory (not shown). The fingerprints recorded in the register phase are called pre-registered fingerprints herein. The method of entering the register phase is determined according to a setting of the operation system 205.

In one aspect, in the register phase, a user (e.g., the owner of the electronic device 100) inputs multiple fingerprints in an arbitrarily sequence. After the input is finished, the operation system 205 of the electronic device 100 executes a setting phase to determine, by the user or by the operation system 205, an input sequence and an operating feature of the multiple fingerprints in the unlocking operation.

In another aspect, in the register phase, the user determines an input sequence and an operating feature of the multiple fingerprints used in the unlocking operation directly in inputting the multiple fingerprints such that when the input is finished (i.e. register phase accomplished), the input sequence and the operating feature of the multiple fingerprints used in the unlocking operation have been determined.

In the unlocking operation, the processor 203 recognizes a fingerprint of each time interval according to the fingerprint data Fig_d from the touch pad 201. When a sequence of multiple fingerprints of the multiple time intervals matches a predetermined sequence, the processor 203 controls (e.g., via sending a control signal S_unlk) the operation system 205 to unlock the electronic device 100.

For example, FIG. 3 shows an embodiment that the touch pad 201 includes a single fingerprint recognition region 101. As mentioned above, the fingerprint of each time interval T1 to T6 is one of multiple pre-registered fingerprints (e.g., shown as L1 to L3 and R1 to R3) of the user. The processor 203 recognizes whether a sequence of the multiple fingerprints in the time intervals T1 to T6 matches the sequence of, e.g., L1→L3→R3→R2→R1→L2. If the sequence is matched, the processor 203 controls (e.g., via control signal S_unlk) the operation system 205 to unlock the electronic device 100. If the sequence is not matched, the processor 203 controls (e.g., via another signal) the operation system 205 to control the electronic device 100 to run the unlocking operation again, e.g., the electronic device 100 showing a message on a display screen thereof to allow the user to input multiple fingerprints again.

Figure 4:
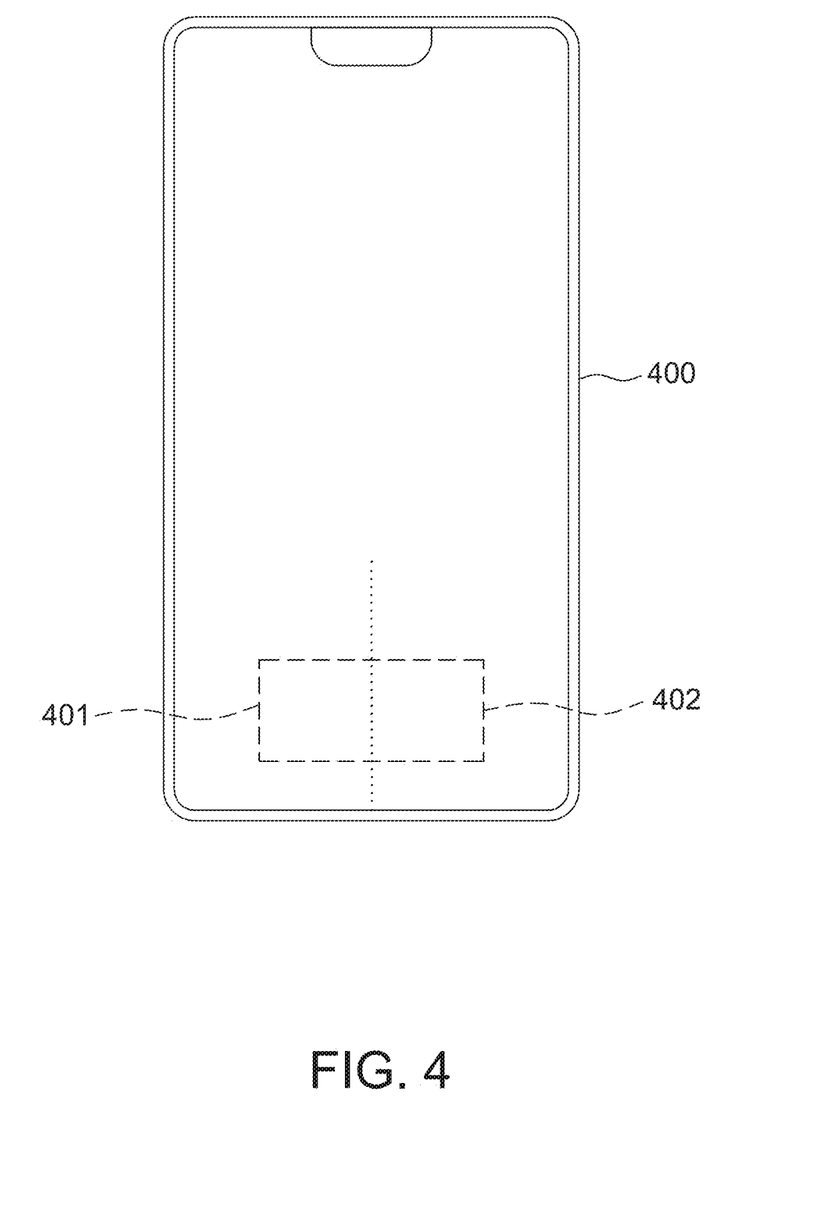
FIG. 4 is a schematic diagram of an electronic device according to one embodiment of the present disclosure, including two fingerprint recognition regions.
Figure 5:
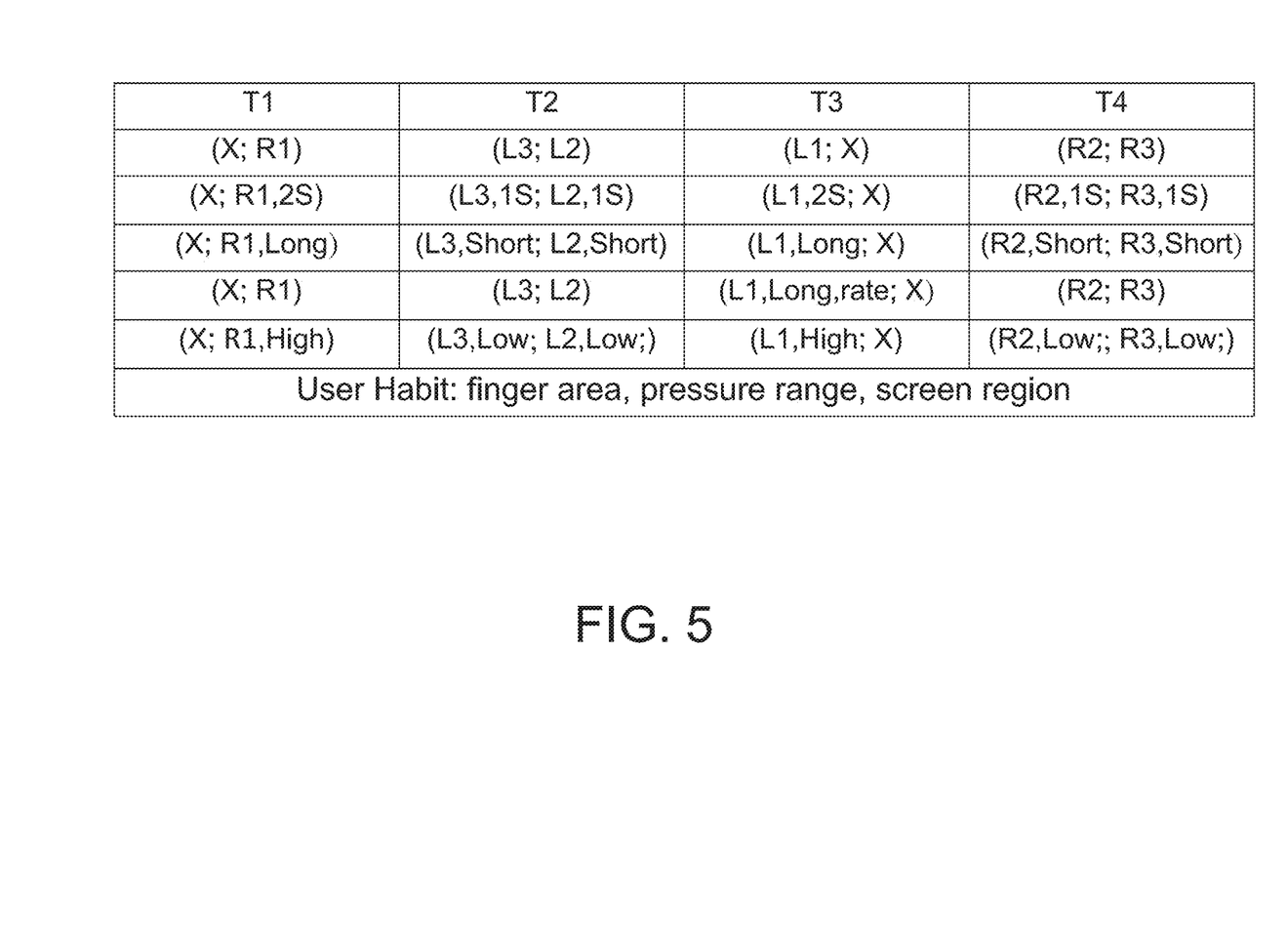
FIG. 5 is a schematic diagram of several aspects of an unlocking method of the electronic device in FIG. 4.

Please refer to FIGS. 4 and 5, FIG. 4 shows an electronic device 400 having two fingerprint recognition regions 401 and 402, each for one finger putting thereon; and FIG. 5 is a schematic diagram of an unlocking method of the electronic device 400 having two fingerprint recognition regions 401 and 402 in an unlocking operation according to some embodiments of the present disclosure. The electronic device 400 is basically identical to the electronic device 100 only with two fingerprint recognition regions 401 and 402.

In FIGS. 4 and 5, since the user uses two fingers to perform the unlocking operation, the fingerprint of each time interval T1 to T6 includes at least one of multiple pre-registered fingerprints of the user. For example, an unlocking requirement in the time interval T1 is arranged as no finger (e.g., shown as X) on the fingerprint recognition region 401 (or 402) and a finger R1 on the fingerprint recognition region 402 (or 401); an unlocking requirement in the time interval T2 is arranged as a finger L3 on the fingerprint recognition region 401 (or 402) and a finger L2 on the fingerprint recognition region 402 (or 401); an unlocking requirement in the time interval T3 is arranged as a finger L1 on the fingerprint recognition region 401 (or 402) and no finger (e.g., shown as X) on the fingerprint recognition region 402 (or 401); and an unlocking requirement in the time interval T4 is arranged as a finger R2 on the fingerprint recognition region 401 (or 402) and a finger R3 on the fingerprint recognition region 402 (or 401). If this sequence is matched/fulfilled, the processor 203 controls the operation system 205 to unlock the electronic device 400. If this sequence is not matched/fulfilled, the processor 203 controls the operation system 205 to run the unlocking operation again.

In the present disclosure, the two fingerprint recognition regions 401 and 402 may or may not limit the finger among pre-defined finger(s) to be put thereon. For example, in the time interval T2, the finger L3 is limited to be put on the fingerprint recognition region 401 and the finger L2 is limited to be put on the fingerprint recognition region 402; or positions of the fingers L3 and L2 are not limited to be put at a specific one of the fingerprint recognition regions 401 and 402 as long as they are put on the fingerprint recognition regions 401 and 402. That is, the finger L3 is put on any one of the fingerprint recognition regions 401 and 402, and the finger L2 is put on the rest of the fingerprint recognition regions 401 and 402.

In one aspect, the processor 203 further identifies whether a heartrate of a user is within a predetermined range (e.g., between 45 times/minute and 75 times/minute, but not limited to) within one of the multiple time intervals for the living body recognition. For example, FIGS. 3 and 5 show that, in the fifth row, the processor 203 detects the user heartrate according to the fingerprint data Fig_d in the time interval T3, wherein the method of recognizing a user heartrate according to fingerprint data can use those known to the art without particular limitations. Or the touch pad 202 further includes an optical heartrate detecting member for the heartrate detection without particular limitations.

In another aspect, in addition to identifying a sequence of multiple fingerprints of the multiple time intervals, the processor 203 further identifies a hold time (i.e. a time interval during which the finger is on the fingerprint recognition region) of fingerprint data in each time interval. When a sequence of the multiple fingerprints of the multiple time intervals matches a predetermined sequence (e.g., shown in FIG. 3), and multiple hold times match a predetermined time variation pattern, the processor 203 controls the operation system 205 to unlock the electronic device 100. As the touch pad 201 has a predetermined detection frequency, in one aspect the processor 203 determines the hold time according to a number of times receiving effective fingerprint data (e.g., capacitance variation exceeding a predetermined value) of each finger. The memory of the electronic device 100 records one hold time corresponding to each pre-registered fingerprint. As mentioned above, each hold time is determined in the register phase or the setting phase without particular limitations.

In one aspect, each of the multiple hold times is a predetermined second.

For example, a third row of FIG. 3 shows that a hold time of the finger L1 is 2 seconds in the time interval T1; a hold time of the finger L3 is 1 second in the time interval T2; a hold time of the finger R3 is 2 seconds in the time interval T3; a hold time of the finger R2 is 1 second in the time interval T4; a hold time of the finger R1 is 3 seconds in the time interval T5; and a hold time of the finger L2 is 1 second in the time interval T6, but not limited thereto.

For example, a third row of FIG. 5 shows that a hold time of the finger R1 is 2 seconds and no finger is on the other fingerprint recognition region (shown as X) in the time interval T1; a hold time of the finger L3 is 1 second and a hold time of the finger L2 is 1 second in the time interval T2; a hold time of the finger L1 is 2 seconds and no finger is on the other fingerprint recognition region (shown as X) in the time interval T3; and a hold time of the finger R2 is 1 second and a hold time of the finger R3 is 1 second in the time interval T4, but not limited to.

In another aspect, a time variation pattern of the multiple hold times includes larger than and smaller than a time threshold, e.g., 1.5 seconds, but not limited thereto.

For example, a fourth row of FIG. 3 shows that a hold time of the finger L1 is larger than the time threshold (e.g., shown as Long) in the time interval T1; a hold time of the finger L3 is smaller than the time threshold (e.g., shown as Short) in the time interval T2; a hold time of the finger R3 is larger than the time threshold in the time interval T3; a hold time of the finger R2 is smaller than the time threshold in the time interval T4; a hold time of the finger R1 is larger than the time threshold in the time interval T5; and a hold time of the finger L2 is smaller than the time threshold in the time interval T6, but not limited thereto.

For example, a fourth row of FIG. 5 shows that a hold time of the finger R1 is larger than the time threshold (e.g., shown as Long) and no finger is on the other fingerprint recognition region (shown as X) in the time interval T1; a hold time of the finger L3 is smaller than the time threshold (e.g., shown as Short) and a hold time of the finger L2 is smaller than the time threshold (e.g., shown as Short) in the time interval T2; a hold time of the finger L1 is larger than the time threshold and no finger is on the other fingerprint recognition region (shown as X) in the time interval T3; and a hold time of the finger R2 is smaller than the time threshold and a hold time of the finger R3 is smaller than the time threshold in the time interval T4, but not limited thereto.

While identifying that the multiple fingerprint data from the touch pad 201 match the time variation pattern shown in FIG. 3 or FIG. 5, the processor 203 controls the operation system 205 to unlock the electronic device 100 or 400. If the predetermined time variation pattern is not matched/fulfilled, the processor 203 controls the operation system 205 to control the electronic device 100 or 400 to run the unlocking operation again.

In another aspect, in addition to identifying a sequence of multiple fingerprints of the multiple time intervals, the processor 203 further identifies a pressure value of fingerprint data in each time interval, i.e. force pressing on the fingerprint recognition region. For example, a larger force causes a larger capacitance variation leading to a larger pressure value; whereas, a smaller force causes a smaller capacitance variation leading to a smaller pressure value.

When a sequence of the multiple fingerprints of the multiple time intervals matches a predetermined sequence, and multiple pressure values match a predetermined pressure variation pattern, the processor 203 controls the operation system 205 to unlock the electronic device 100 or 400. The memory of the electronic device 100 or 400 records one pressure value or one pressure range corresponding to each pre-registered fingerprint. Similarly, said one pressure value or one pressure range is determined in the register phase or the setting phase without particular limitations.

In one aspect, a pressure variation pattern of the multiple pressure values includes larger than and smaller than a pressure threshold, e.g., determined according to a detectable pressure range of the touch pad.

For example, a sixth row of FIG. 3 shows that a pressure value of the finger L1 is larger than the pressure threshold (e.g., shown as H press) in the time interval T1; a pressure value of the finger L3 is smaller than the pressure threshold (e.g., shown as L press) in the time interval T2; a pressure value of the finger R3 is larger than the pressure threshold in the time interval T3; a pressure value of the finger R2 is smaller than the pressure threshold in the time interval T4; a pressure value of the finger R1 is larger than the pressure threshold in the time interval T5; and a pressure value of the finger L2 is smaller than the pressure threshold in the time interval T6, but not limited thereto.

For example, a sixth row of FIG. 5 shows that a pressure value of the finger R1 is larger than the pressure threshold (e.g., shown as High) and no finger is on the other fingerprint recognition region (shown as X) in the time interval T1; a pressure value of the finger L3 is smaller than the pressure threshold (e.g., shown as Low) and a pressure value of the finger L2 is smaller than the pressure threshold (e.g., shown as Low) in the time interval T2; a pressure value of the finger L1 is larger than the pressure threshold and no finger is on the other fingerprint recognition region (shown as X) in the time interval T3; and a pressure value of the finger R2 is smaller than the pressure threshold and a pressure value of the finger R3 is smaller than the pressure threshold in the time interval T4, but not limited thereto.

While identifying that the multiple fingerprint data from the touch pad 201 match the pressure variation pattern shown in FIG. 3 or FIG. 5, the processor 203 controls the operation system 205 to unlock the electronic device 100 or 400. If the predetermined pressure variation pattern is not matched/fulfilled, the processor 203 controls the operation system 205 to control the electronic device 100 or 400 to run the unlocking operation again.

It should be mentioned that the fingerprint sequence, the hold times, the heartrate detection and the pressure values in FIGS. 3 and 5 are combinable to form another embodiment to further increase the security.

Furthermore, to further improve the security, the electronic devices 100 and 400 of the present disclosure are further embedded with a machine learning algorithm (e.g., in the processor 203 using software, firmware and/or hardware) to construct a category model, including a valid user category, according to user habits so as to recognize whether a current user is a valid user or not. Any user who is not categorized as the valid user is categorized as an invalid user, who is not able to unlock the electronic device 100 and 400.

For example, the operation system 205 of the electronic device 100 and 400 asks a user whether to perform user operating habits learning after each register/setting phase. If the user accepts (e.g., selecting an icon or menu), the machine learning algorithm constructs a category model within a predetermined learning period (e.g., between one week and a month, or reaching a number of unlocking times) according to the user operating habits (e.g., including at least one of a finger area, a pressure range and a screen region mentioned below) during each unlocking operation in order to distinguish the valid user. After the predetermined learning period, the processor 203 controls the operation system 205 to unlock the electronic device using the category model constructed in the predetermined learning period in conjunction with the above sequence of multiple fingerprints, the time variation pattern of multiple hold times and/or the pressure variation pattern of multiple pressure values.

In other aspects, the operation system 25 automatically activates the user operating habits learning after each register/setting phase.

In the unlocking operation, the processor 203 firstly identifies whether a current user matches the user operating habits. If the match is not reached, the processor 203 is not continuous to identify the above sequence of multiple fingerprints, the time variation pattern of multiple hold times and/or the pressure variation pattern of multiple pressure values. If a match is reached, the processor 203 then identifies the above sequence of multiple fingerprints, the time variation pattern of multiple hold times and/or the pressure variation pattern of multiple pressure values.

In another aspect, the processor 203 identifies whether the current user's operation matches the user operating habits simultaneously in identifying the above sequence of multiple fingerprints, the time variation pattern of multiple hold times and/or the pressure variation pattern of multiple pressure values.

Figure 6:
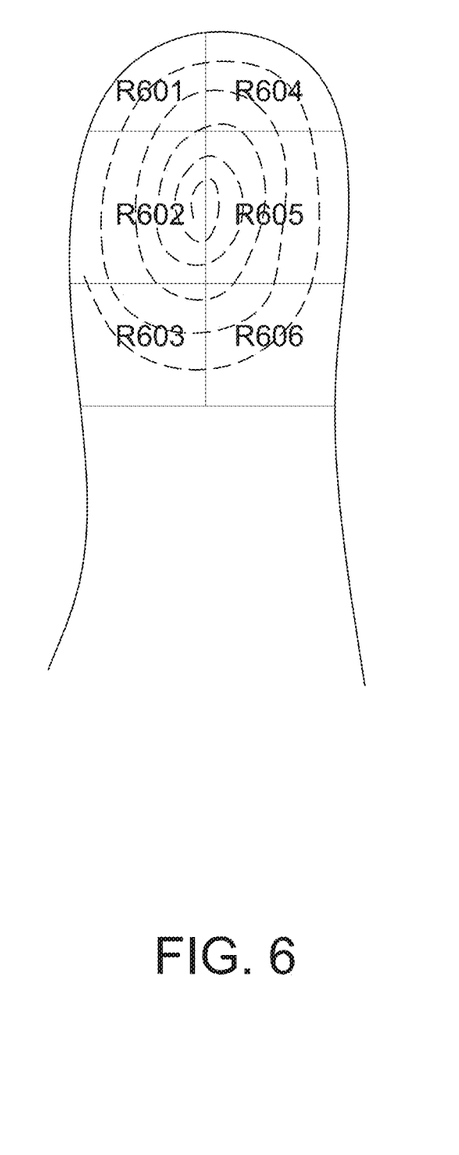
FIG. 6 is a schematic diagram of different finger areas recognized by an electronic device according to one embodiment of the present disclosure.

Please refer to FIG. 6, the machine learning algorithm learns a habitual touched area (e.g., shown as R601 to R606) of each finger (e.g., the above L1 to L3 and R1 to R3) within the predetermined learning period, and constructs a finger area category model. The finger area category model is constructed based on that a user generally uses different fingerprint areas, which can be distinguished according to the recognized fingerprint, of a finger to contact the fingerprint recognition region. After the predetermined learning period, the processor 203 identifies whether a current user is a valid user according to the finger area category model.

For example, when the finger area category model indicates that the valid user generally uses finger areas R601, R602 and R603 to perform the fingerprint recognition, and when the processor 203 identifies that a current user uses finger areas R601, R602, R604 and R605 to perform the fingerprint recognition, the processor 203 determines that the unlocking is failed even though a fingerprint recognition result is positive. It is noticed that different fingers generally use different finger(print) areas to contact the fingerprint recognition region.

Figure 7:
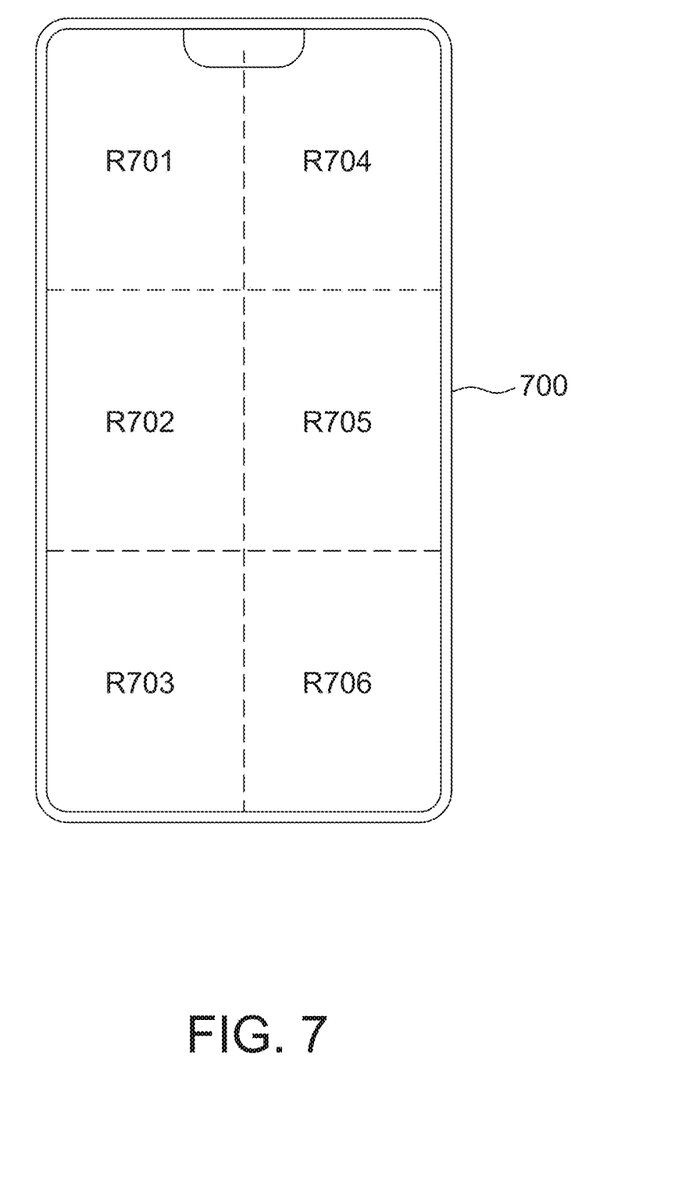
FIG. 7 is a schematic diagram of different screen regions recognized by an electronic device according to one embodiment of the present disclosure.

Please refer to FIG. 7, the machine learning algorithm learns a habitual operation region (e.g., shown as R701 to R706 which is divided by the machine learning algorithm or the operation system 205) of each finger (e.g., the above L1 to L3 and R1 to R3) within the predetermined learning period, and constructs a screen region category model. The screen region category model is constructed based on that a user generally uses fingers to contact different screen regions. In this aspect, it is assumed that the display screen is also the touch screen. After the predetermined learning period, the processor 203 identifies whether a current user is a valid user according to the screen region category model. For example, when the screen region category model indicates that the valid user generally uses screen regions R702 and R703 to perform the fingerprint recognition, and when the processor 203 identifies that a current user uses the finger area R701 to perform the fingerprint recognition, the processor 203 determines that the unlocking is failed even though a fingerprint recognition result is positive. It is noticed that different fingers generally contact different screen regions.

In addition, the machine learning algorithm further learns a habitual pressure range of each finger (e.g., the above L1 to L3 and R1 to R3) within the predetermined learning period, and constructs a pressure range category model. The pressure range category model is constructed based on that a user generally uses different forces to contact fingerprints. After the predetermined learning period, the processor 203 identifies whether a current user is a valid user according to the pressure range category model. It is noticed that different fingers generally use different pressure ranges.

It is appreciated that user's habitual operations are not limited to those mentioned herein, and may further include, e.g., a device tilted angle during the unlocking operation. The user's habitual operations are used to construct a category model previously using the machine learning. The category model is recorded in the memory and provided to the processor 203 or the operation system 205 to identify an identity of a current user.

It should be mentioned that although the present disclosure is illustrated by using a capacitive touch pad as an example, the present disclosure is not limited thereto. For example, when the touch pad 201 is an optical touch pad, the finger putting on the fingerprint recognition region causes the optical energy variation, which is known to the art and thus details thereof are not described herein.

It should be mentioned that a number of time intervals, a fingerprint sequence, a time variation pattern, a pressure variation pattern and the selected time interval for measuring heartrate illustrated in the present disclosure are only intended to illustrate but not to limit the present disclosure.

It should be mentioned that although the drawings of the present disclosure show that the touch pad (i.e. 101, 401 and 402) is within a display region of the electronic device, the present is not limited thereto. In other aspects, the touch pad is separated and independent from the display screen.

It should be mentioned that when the electronic device of the present disclosure is arranged to be able to recognize two fingerprints using two fingerprint recognition regions, the user is able to control the electronic device of the present disclosure to select the single-finger unlocking method of FIG. 3 or the two-finger unlocking method of FIG. 5 using the operation system 205.

It should be mentioned that although the drawings of the present disclosure show that the same finger does not appear in different time intervals (e.g., T1 to T6 in FIGS. 3 and T1 to T4 FIG. 5), the present disclosure is not limited thereto. In other aspects, the same finger is used in different time intervals. In addition, it is not necessary to use all pre-registered fingers in the unlocking operation.

It should be mentioned that although the above embodiments are illustrated by using a single and two fingerprint recognition regions as examples, the present disclosure is not limited thereto. For example in an aspect that the whole display screen is used to detect the fingerprint(s), the electronic device includes more than two fingerprint recognition regions as long as the operation system 205 can support the multi-fingerprint detection.

It should be mentioned that although the above embodiments are illustrated by using a cellphone as an example, the present disclosure is not limited thereto. The electronic device is any device that uses a digital electronic lock and fingerprint unlock technique, e.g., including a vehicle central control system, a door lock system or a smart home appliance system, but not limited thereto.

Positions of the fingerprint recognition regions 101, 401 and 402 in FIGS. 1 and 4 are only intended to illustrate but not to limit the present disclosure.

As mentioned above, because the technique of making a fake-fingerprint has a rapid progress, simply using a fingerprint as a tool of unlocking an electronic device can possibly be broken. Accordingly, the present disclosure provides an electronic device unlocked by a fingerprint sequence in multiple time intervals in conjunction with an operating feature (e.g., as shown in FIGS. 3 and 5) in which even though all user fingerprints are copied, an invalid user is still difficult to unlock the electronic device using the fake fingerprints to significantly improve the data security. Furthermore, the electronic device of present disclosure is further able to learn the user habits using machine learning to be involved in the unlocking operation thereby decreasing the possibility of breaking a digital electronic lock.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

The invention claimed is:
1. An electronic device, comprising:
a touch pad, configured to respectively output fingerprint data within sequential multiple time intervals;
an operation system, embedded in the electronic device and configured to unlock the electronic device; and
a processor, configured to
recognize a fingerprint of each time interval according to the fingerprint data, and
control the operation system to unlock the electronic device upon a sequence of multiple recognized fingerprints of the multiple time intervals matching a predetermined sequence, wherein the processor is further
embedded with a machine learning algorithm, which is configured to construct a category model within a predetermined learning period according to at least one of a finger area, a pressure range and a screen region during each unlocking operation, and
configured to control the operation system to unlock the electronic device according to the category model in conjunction with the sequence of the multiple recognized fingerprints.

2. The electronic device as claimed in claim 1, wherein the touch pad comprises a single fingerprint recognition region, and
the fingerprint of the each time interval includes one of multiple pre-registered fingerprints of a user.

3. The electronic device as claimed in claim 1, wherein the touch pad comprises two fingerprint recognition regions, and
the fingerprint of the each time interval includes at least one of multiple pre-registered fingerprints of a user.

4. The electronic device as claimed in claim 1, wherein the processor is further configured to identify whether a heartrate of a user is within a predetermined range within one of the multiple time intervals.

5. An electronic device, comprising:
a touch pad, configured to respectively output fingerprint data within sequential multiple time intervals using a predetermined detection frequency;
an operation system, embedded in the electronic device and configured to unlock the electronic device; and
a processor, configured to
recognize a fingerprint and a hold time of the fingerprint data of each time interval according to the fingerprint data, and
control the operation system to unlock the electronic device upon a sequence of multiple recognized fingerprints of the multiple time intervals matching a predetermined sequence and multiple recognized hold times matching a predetermined time variation pattern, wherein
the processor is further
embedded with a machine learning algorithm, which is configured to construct a category model within a predetermined learning period according to at least one of a finger area, a pressure range and a screen region during each unlocking operation, and
configured to control the operation system to unlock the electronic device according to the category model in conjunction with the sequence of the multiple recognized fingerprints and a time variation pattern of the multiple recognized hold times.

6. The electronic device as claimed in claim 5, wherein the touch pad comprises a single fingerprint recognition region,
the fingerprint of the each time interval includes one of multiple pre-registered fingerprints of a user, and
each of the multiple pre-registered fingerprints of the user has a corresponding predetermined hold time.

7. The electronic device as claimed in claim 5, wherein the touch pad comprises two fingerprint recognition regions,
the fingerprint of the each time interval includes at least one of multiple pre-registered fingerprints of a user, and
each of the multiple pre-registered fingerprints of the user has a corresponding predetermined hold time.

8. The electronic device as claimed in claim 5, wherein each of the multiple recognized hold times is a predetermined seconds.

9. The electronic device as claimed in claim 5, wherein a time variation pattern of the multiple recognized hold times includes larger than and smaller than a time threshold.

10. The electronic device as claimed in claim 5, wherein the processor is further configured to identify whether a heartrate of a user is within a predetermined range within one of the multiple time intervals.

11. An electronic device, comprising:
a touch pad, configured to respectively output fingerprint data within sequential multiple time intervals using a predetermined detection frequency;
an operation system, embedded in the electronic device and configured to unlock the electronic device; and
a processor, configured to
recognize a fingerprint and a pressure value of each time interval according to the fingerprint data, and
control the operation system to unlock the electronic device upon a sequence of multiple recognized fingerprints of the multiple time intervals matching a predetermined sequence and multiple recognized pressure values matching a predetermined pressure variation pattern, wherein
the processor is further
embedded with a machine learning algorithm, which is configured to construct a category model within a predetermined learning period according to at least one of a finger area, a pressure range and a screen region during each unlocking operation, and
configured to control the operation system to unlock the electronic device according to the category model in conjunction with the sequence of the multiple recognized fingerprints and a pressure variation pattern of the multiple recognized pressure values.

12. The electronic device as claimed in claim 11, wherein the touch pad comprises a single fingerprint recognition region,
the fingerprint of the each time interval includes one of multiple pre-registered fingerprints of a user, and
each of the multiple pre-registered fingerprints of the user has a corresponding predetermined pressure range.

13. The electronic device as claimed in claim 11, wherein the touch pad comprises two fingerprint recognition regions,
the fingerprint of the each time interval includes at least one of multiple pre-registered fingerprints of a user, and
each of the multiple pre-registered fingerprints of the user has a corresponding predetermined pressure range.

14. The electronic device as claimed in claim 11, wherein a pressure variation pattern of the multiple recognized pressure values includes larger than and smaller than a pressure threshold.

15. The electronic device as claimed in claim 11, wherein the processor is further configured to identify whether a heartrate of a user is within a predetermined range within one of the multiple time intervals.

16. The electronic device as claimed in claim 11, wherein the processor is further configured to
recognize a hold time of the each time interval of the fingerprint data according to the fingerprint data, and
identify whether multiple recognized hold times of the multiple time intervals match a predetermined time variation pattern.

17. The electronic device as claimed in claim 16, wherein
each of the multiple recognized holds time is a predetermined second, or
a time variation pattern of the multiple recognized hold times includes larger than and smaller than a time threshold.

\* \* \* \* \*